(12) United States Patent
Park

(10) Patent No.: US 10,676,957 B1
(45) Date of Patent: Jun. 9, 2020

(54) TENT SYSTEM

(71) Applicant: HKD Global Limited, Hong Kong (CN)

(72) Inventor: Bumjun Park, Seoul (KR)

(73) Assignee: HKD GLOBAL LIMITED, Hong Kong (CN)

( * ) Notice: Subject to any disclaimer, the term of this patent is extended or adjusted under 35 U.S.C. 154(b) by 0 days.

(21) Appl. No.: 16/422,087

(22) Filed: May 24, 2019

(51) Int. Cl.
E04H 15/64 (2006.01)
E04H 15/42 (2006.01)
E04H 15/40 (2006.01)

(52) U.S. Cl.
CPC ............. *E04H 15/64* (2013.01); *E04H 15/40* (2013.01); *E04H 15/42* (2013.01)

(58) Field of Classification Search
CPC ....... E04H 15/322; E04H 15/36; E04H 15/42; E04H 15/40; E04H 15/64
See application file for complete search history.

(56) References Cited

U.S. PATENT DOCUMENTS

| | | | | |
|---|---|---|---|---|
| 3,223,098 A * | 12/1965 | Dole, Jr. | ............... | E04H 15/425 135/126 |
| 4,782,846 A * | 11/1988 | Ting | ........................ | E04H 15/62 135/118 |
| 5,333,634 A | 8/1994 | Taylor | | |
| 5,421,355 A * | 6/1995 | Cantwell | ............... | E04H 15/425 135/115 |
| 5,615,699 A * | 4/1997 | Lee | ......................... | E04H 15/64 135/118 |
| 5,666,986 A * | 9/1997 | Fox | ......................... | E04H 15/42 135/135 |
| 5,884,646 A * | 3/1999 | Ju | ........................... | E04H 15/64 135/135 |
| 6,681,786 B2 * | 1/2004 | Ju | ........................... | E04H 15/48 135/118 |
| 6,854,476 B1 * | 2/2005 | Chai | ....................... | E04H 15/48 135/135 |
| 7,316,239 B2 * | 1/2008 | Yang | .................... | E04H 15/003 135/117 |
| 8,763,621 B2 * | 7/2014 | Jin | ......................... | E04H 15/44 135/115 |
| 9,976,318 B2 * | 5/2018 | Lynch | ..................... | E04H 15/40 |
| 10,041,271 B2 * | 8/2018 | Jin | ......................... | E04H 15/36 |

(Continued)

FOREIGN PATENT DOCUMENTS

KR 2005-0045217 A 5/2005

*Primary Examiner* — David R Dunn
*Assistant Examiner* — Danielle Jackson
(74) *Attorney, Agent, or Firm* — Novick, Kim & Lee, PLLC; Jae Youn Kim

(57) ABSTRACT

A tent system including: a fabric member including a body portion and a bottom portion to form a resident space; a fixing device disposed at the fabric member and including a mesh pocket, an upper clip, a lower clip and a side clip; a main pole coupled to the fabric member in an X-shape through the fixing device, in which one end and an opposite end of the main pole are supported by the mesh pocket and the lower clip, respectively; and an adjusting device that allows at least one of the fixing device and the main pole to have a variable structure. The tent is easily installed and disassembled even by one person with a simple structure and maintains a tight supported state to the ground, so that usability is improved in cost-effectiveness.

3 Claims, 7 Drawing Sheets

(56) References Cited

U.S. PATENT DOCUMENTS

| | | | |
|---|---|---|---|
| 2008/0142063 A1* | 6/2008 | Lah | E04H 15/64 135/120.3 |
| 2016/0060897 A1* | 3/2016 | Baoqing | E04H 15/60 135/146 |
| 2018/0023314 A1* | 1/2018 | Day | E04H 15/322 135/123 |

* cited by examiner

TENT SYSTEM

BACKGROUND OF THE INVENTION

1. Field of the Invention

The present invention relates to a tent system, and more specifically, to a tent system easily installed and disassembled by a small number of people during an outdoor activity.

2. Description of the Related Art

In major countries, the industry for outdoor sporting goods continues to grow steadily as the camping tends to become more invigorated. Although there are wide choices for a tent to a beginner and an expert, a structure for easy installation and disassembly is still regarded as a basic requirement. When an automatic foldable type is applied to improve the convenience, the waterproofness is weakened and the cost is increased.

Korean Patent Registration No. 2005-0045217 discloses an automatic tent improved in a structure of an auxiliary connecting member for connecting a pole to another pole of the tent. A spring is excluded or hidden to lower corrosion and prevent the auxiliary connecting member from being broken or a joint part of the pole from being broken.

U.S. Pat. No. 5,333,634 discloses a foldable tent known as an umbrella tent integrally formed with a frame and a cover. Washers formed up and down at both ends of a pole are engaged with a round hole of a web strap, so that the tent is installed quickly and easily and folded and moved conveniently.

However, according to the above-mentioned document in the related art, it is difficult to solve the lowering of waterproofness and the increase of the cost due to the structural complexity.

Korean Patent Registration No. 2005-0045217 "AUTOMATIC TENT USING SNAP-THRU" (Published date: May 17, 2005)

U.S. Pat. No. 5,333,634 "INVERSE UMBRELLA TENT" (Published date: Aug. 2, 1994)

SUMMARY OF THE INVENTION

To solve the above problems in the related art, the present invention provides a tent system easily installed and disassembled even by one person based on a simple structure, and maintaining a tightly supported state with respect to the ground.

To this end, According to the present invention, the tent system includes: a fabric member including a body portion and a bottom portion to form a resident space; a fixing device disposed at the fabric member and including a mesh pocket, an upper clip, a lower clip and a side clip; a main pole coupled to the fabric member in an X-shape through the fixing device, in which one end and an opposite end of the main pole are supported by the mesh pocket and the lower clip, respectively; and an adjusting device that allows at least one of the fixing device and the main pole to have a variable structure.

According to the detailed configuration of the present invention, the main pole is provided at the one end thereof with a cap and at the opposite end thereof with a hook.

According to the detailed configuration of the present invention, the fixing device is configured that the upper clip is coupled to an upper end of the main pole forming an X-shape skeleton, and the lower clip is detachably engaged to the hook of the main pole.

In a first embodiment of the present invention, the adjusting device is configured that the lower clip has an engaging structure of a female member and a male member, the female member and the male member are slidable within a predetermined stroke distance, and the female member and the male member hold fastening holes, which are coupled to the hook, in an overlapped state.

In a second embodiment of the present invention, the adjusting device includes a sleeve coupled to the one end of the main pole to form the hook, an auxiliary pack accommodated in the sleeve such that the auxiliary pack moves in and out concentrically with the sleeve, a stopper accommodated in the sleeve to control the movement of the auxiliary pack, a button extending outward from one end of the stopper, and a spring for applying an elastic force to an opposite end of the stopper.

As described above, according to the present invention, the tent is easily installed and disassembled even by one person based on a simple structure, and maintains a tightly supported state with respect to the ground, so that the usability can be improved in terms of cost-effectiveness.

DETAILED DESCRIPTION OF THE INVENTION

Figure 1:
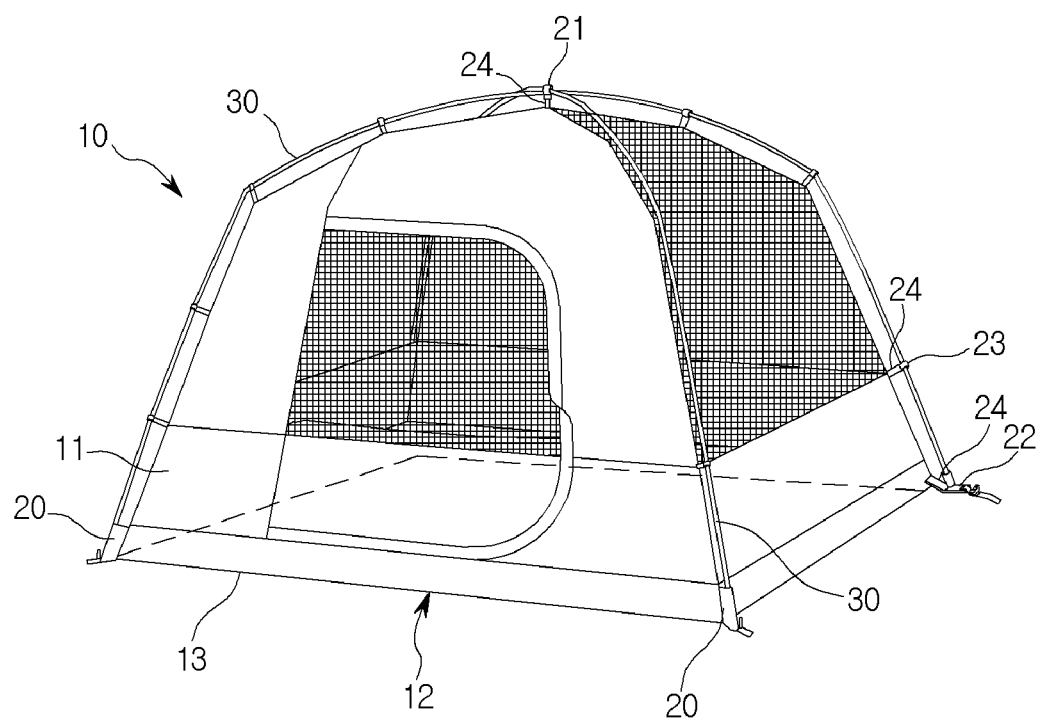
FIG. 1 is a front view showing a tent according to the present invention.

Hereinafter, the embodiments of the present invention will be described in detail with reference to the accompanying drawings.

The present invention provides a tent system. The present invention is directed to a tent installed and disassembled by one person during an outdoor activity, but is not limited thereto.

A fabric member 10 according to the present invention is configured to include a body portion 11 and a bottom portion 12 to form a resident space. The fabric member 10 is formed of a known material having strength, waterproofness, flexibility or the like required for the tent. The bottom portion 12 refers to a portion facing the ground, and the body portion 11 refers to a portion extending upward from the bottom portion 12. The body portion 11 and the bottom portion 12 are coupled in a substantially rectangular shape via a connecting portion 13. According to types of the tent, a plurality of connecting portions 13 may be provided on the body portion 11.

Referring to FIG. 1, the tent system is provided with an entrance opened and closed in a front of the body portion 11.

The connecting portion 13 includes four side parts and four corner parts, and the body portion 11 includes four side parts extending from corner parts.

Referring to FIG. 2, the tent system may further include a fly 15 surrounding an outer surface of the fabric member 10.

Figure 2A:
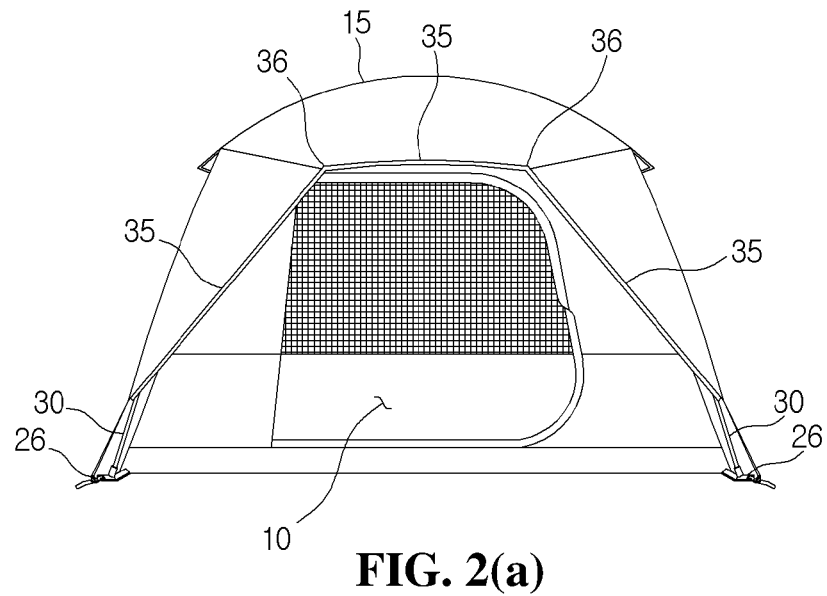
FIGS. 2(a) and 2(b) are schematic views showing a state where a fly is provided in FIG. 1.
Figure 2B:
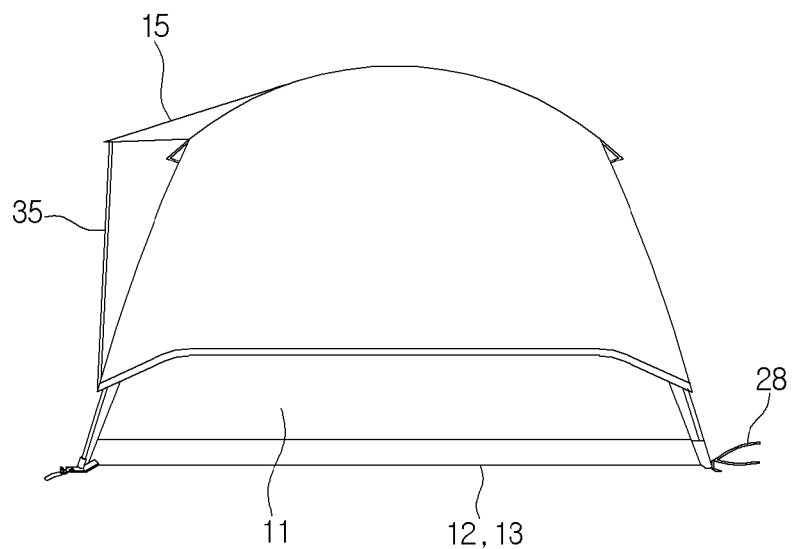

FIG. 2(a) is a front view of the tent, and FIG. 2(b) is a side view of the tent.

FIG. 2 shows a state in which a binding band 28 is connected to the connecting portion 13 at a rear side of the tent. The binding band 28 is formed of a hook-and-loop fastener, and used for wrapping and storing the fabric member 10 and the main poles 30.

In addition, according to the present invention, the fixing device is disposed at the fabric member 10 and includes a mesh pocket 20, an upper clip 21, a lower clip 22, and a side clip 23. The fixing device is a medium for connecting the fabric member 10 to the main pole 30 described later, and holds a resident space by the body portion 11 and the bottom portion 12. The mesh pockets 20 are formed of a mesh fabric and coupled to two corner parts in the connecting portion 13. The mesh fabric of the mesh pocket 20 prevents an inside of the tent from being permeated by water or foreign matter. The upper clip 21 is fixed to a central upper end of the body portion 11 through a webbing loop 24. The lower clips 22 are coupled to two corner parts opposite to the mesh pocket 20 in the connecting portion 13 through the webbing loops 24. The side clips 23 are coupled to the four side parts of the body portion 11 at regular intervals with the webbing loops 24.

In addition, according to the present invention, the main poles 30 may be coupled to the fabric member 10 in an X-shape through the fixing device, and one end and an opposite end are supported by the mesh pocket 20 and the lower clip 22, respectively. FIG. 1 illustrates a typical tent in which two main poles 30 form a skeleton intersecting in an X-shape. The main pole 30 is formed of a highly elastic material and configured to be foldable with a plurality of sections. When the fabric member 10 is coupled to the main poles 30 forming the X-shaped skeleton, the resident space is formed in the tent. The mesh pocket 20 ensures the main pole 30 to be easily attached and detached, and the lower clip 22 ensures the main pole 30 to be tightly supported. When the main pole 30 is associated with the mesh pocket 20 and the lower clip 22, the tent can be easily and safely installed and disassembled by one person. The detailed operational effect will be described later.

Figure 3:
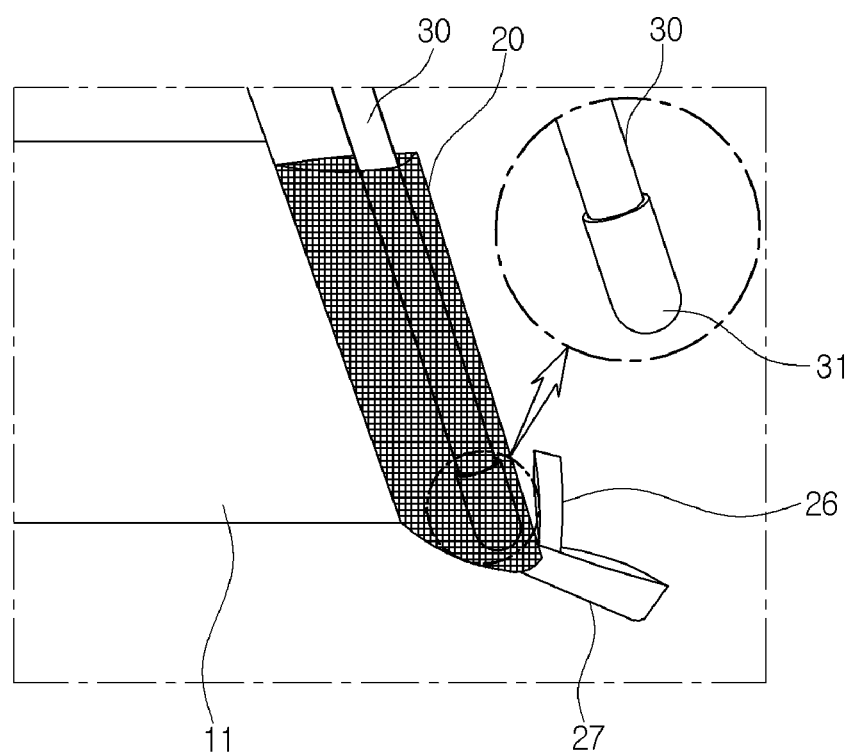
FIG. 3 is a view showing a mesh pocket of a tent according to the present invention.

In FIG. 3, a fly loop 26 and a peck loop 27 are simultaneously connected to a lower end of the mesh pocket 20.

Figure 4:
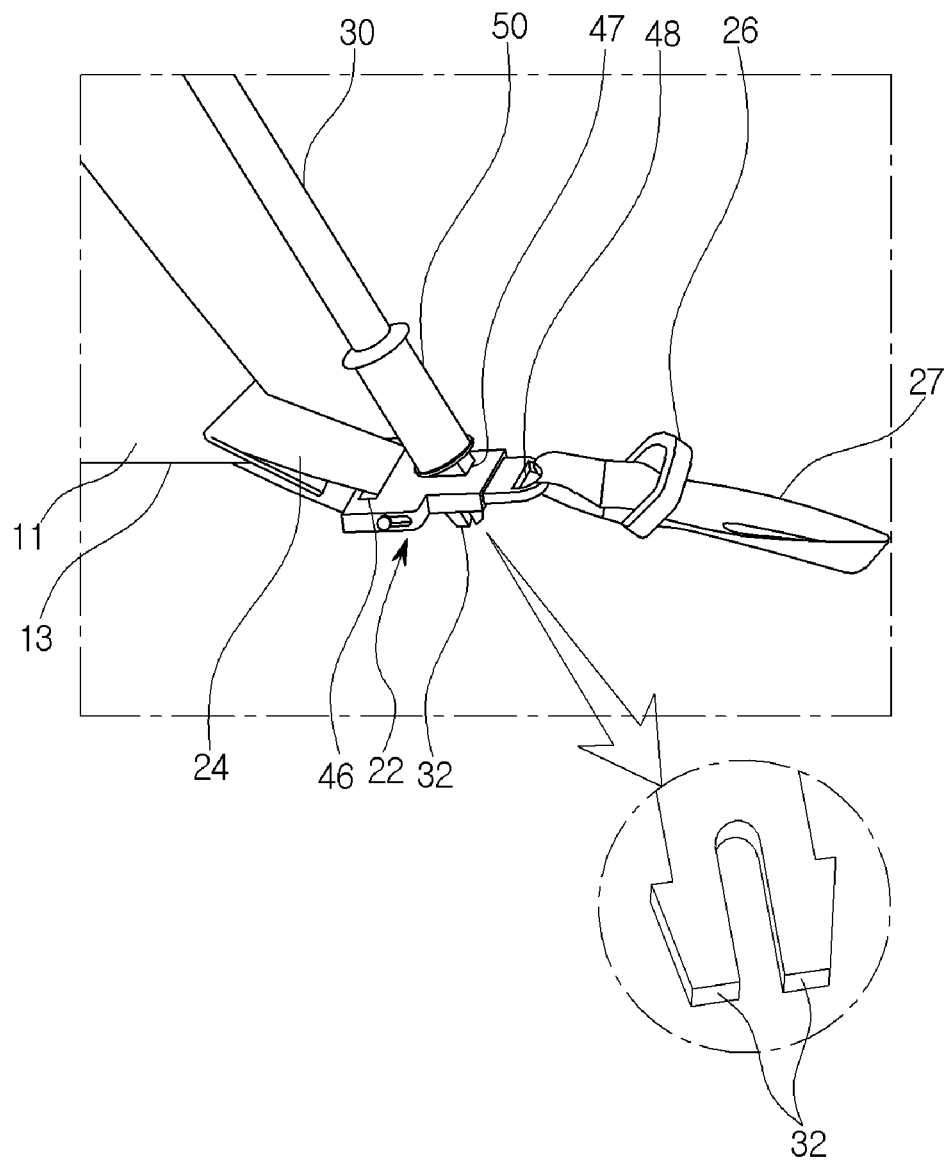
FIG. 4 is a view showing a fixing device of a tent according to the present invention.

According to the detailed configuration of the present invention, the main pole 30 is provided at the one end thereof with a cap 31 and at the opposite end thereof with a hook 32. FIG. 3 shows a state in which one end of the main pole 30 is provided with a cap 31 and accommodated in the mesh pocket 20. The cap 31 is a cylindrical member having a hemispherical end to enable the cap 31 to smoothly move from and to an opening of the mesh pocket 20. FIG. 4 shows a state in which the opposite end of the main pole 30 is coupled to the lower clip 22 through the hook 32. The hook 32 is formed of a pair of members facing each other and elastically deformed, and engaged with fastening holes 47 of the lower clip 22.

Figure 6A:
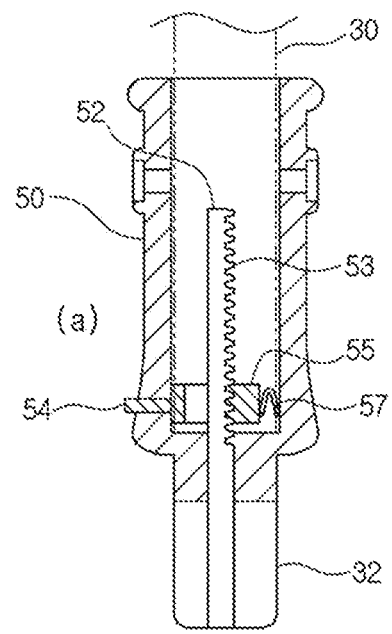
FIGS. 6(a), 6(b), 6(c), 6(d) and 6(e) are views showing a second embodiment of an adjusting device according to the present invention.
Figure 6B:
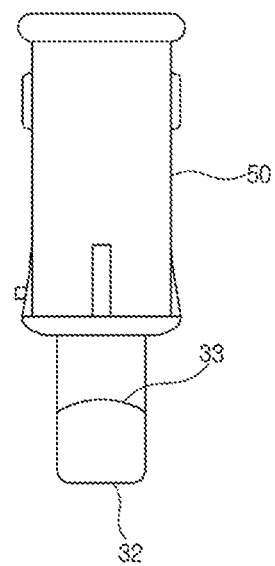

Herein, the hook 32 of FIG. 4 is shown as FIG. 6(b) when viewed from a side. An arc-shaped step 33 formed on a side surface of the hook 32 alleviates the shock when the main pole 30 shakes, in addition to the engagement with the fastening hole 47.

According to the detailed configuration of the present invention, the fixing device is configured that the upper clip 21 is coupled to an upper end of the main pole 30 forming an X-shape skeleton, and the lower clip 22 is detachably engaged to the hook 32 of the main pole 30. After the hook 32 at one end of the main pole 30 is coupled to the lower clip 22, and the cap 31 at the opposite end is inserted into the mesh pocket 20, the main pole 30 forms a stable arch, so that the tent can be assembled by one person. In the same manner, when the remaining main pole 30 is inserted to form an arch, and two main poles 30 are erected, the X-shaped skeleton is completed. The intersection of the completed X-shaped main poles 30 is hooked by the upper clip 21 to hold the skeleton. The upper clip 21 is formed in a C-shape to prevent the two main poles 30 forming the arch from being twisted. The lower clip 22 is configured to be tightly engaged with the hook 32 to constrain an arbitrary ejection and facilitate a separation in a preset manner. Accordingly, the tent can be easily completed by hanging the fabric member 10 by one person, and easily disassembled after use.

In FIG. 4, the lower clip 22 includes an inner hole 46, a fastening hole 47, and an outer hole 48. The webbing loop 24 is connected to the inner hole 46 of the lower clip 22 at the corner part of the body portion 11. A fly loop 26 and a peg loop 27 are connected to the outer hole 48 of the lower clip 22.

In addition, when the fly 15 is used as shown in FIG. 2, it is preferable to provide a sub-pole 35. The fly 15 is coupled to the ply loop 26 using an additional band. The sub-pole 35 may be partially provided with a hinge 36.

In addition, according to the present invention, the adjusting device allows at least one of the fixing device and the main pole 30 to have a variable structure. The adjusting device is implemented as a first embodiment for the fixing device and a second embodiment for the main pole 30. In the first embodiment, the lower clip 22 facilitates the main pole 30 to be tightly coupled and ensures the easy disassembly. In the second embodiment, the hook 32 is supported tightly against the ground and the bottom portion 12 is spaced apart from the ground, thereby preventing water intrusion in the rainy weather.

In the first embodiment of the present invention, the adjusting device is configured that the lower clip 22 has an engaging structure of a female member 41 and a male member 42, the female member 41 and the male member 42 are slidable within a predetermined stroke distance, and the female member 41 and the male member 42 hold fastening holes 47, which are coupled to the hook 32, in an overlapped state.

Figure 5A:
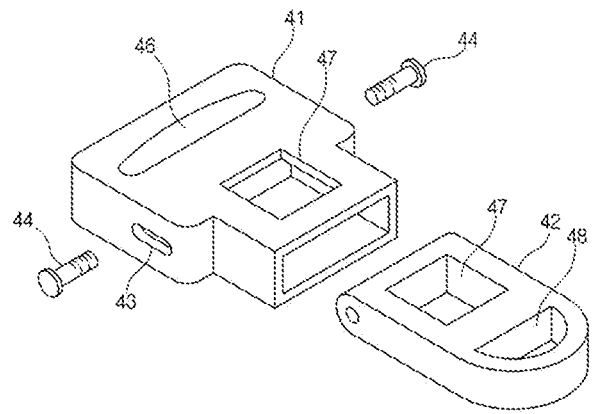
FIGS. 5(a), 5(b), and 5(c) are views showing a first embodiment of an adjusting device according to the present invention.
Figure 5B:
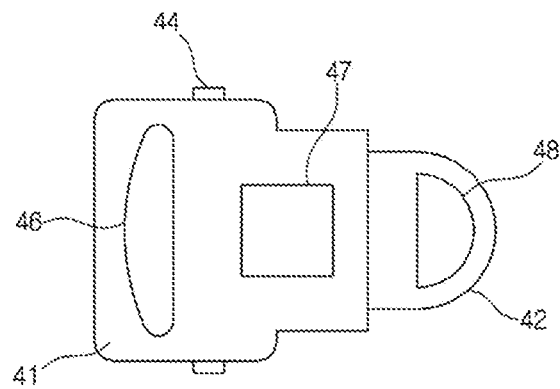
Figure 5C:
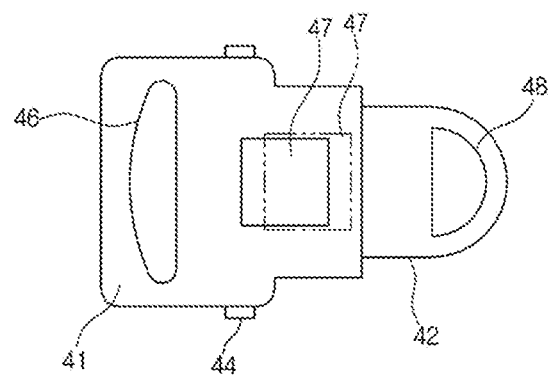

FIG. 5(a) shows the adjusting device separated to the female member 41 and the male member 42. FIG. 5(b) shows a state in which the male member 42 is maximally inserted into the female member 41. FIG. 5(c) shows a state in which the male member 42 is maximally detracted from the female member 41. The female member 41 is formed in an upper surface thereof with an inner hole 46 and a fastening hole 47 and in a side surface thereof with a slot 43. The male member 42 is formed in an upper surface thereof with a fastening hole 47 and an outer hole 48. A screw 44 is coupled to a side surface of the male member 42 through the slot 43. In FIG. 5(b), when the screw 44 moves to a left end of the slot 43, the overlapped fastening holes 47 of the female member 41 and the male member 42 are changed into a maximum size, so that the hook 32 is easily separated. In FIG. 5(c), when the screw 44 moves to a right end of the slot 43, the overlapped fastening holes 47 are changed into a minimum size, so that the hook 32 is tightly restrained.

According to the above configuration, the hook 32 is easily engaged tightly or disengaged only by pushing in or pulling out the male member 42 with respect to the female member 41.

In the second embodiment of the present invention, the adjusting device includes a sleeve 50 coupled to the one end of the main pole 30 to form a hook 32, an auxiliary pack 52 accommodated in the sleeve 50 to move in and out concentrically with the sleeve 50, a stopper 55 accommodated in the sleeve 50 to control the moving of the auxiliary pack 52, a button 54 extending outward from one end of the stopper 55, and a spring 57 for applying an elastic force to an opposite end of the stopper 55.

Figure 6C:
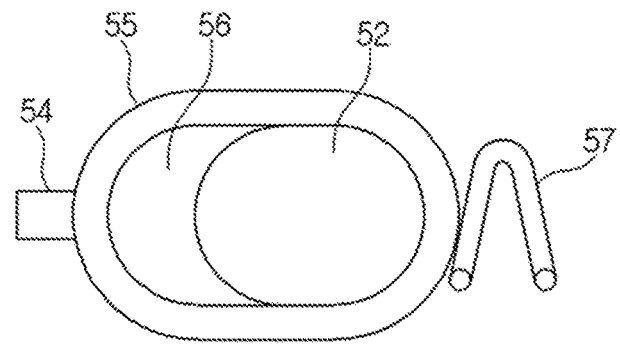
Figure 6D:
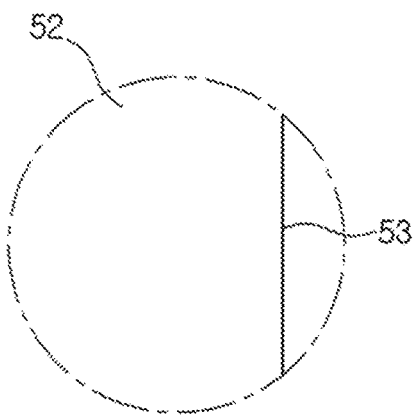
Figure 6E:
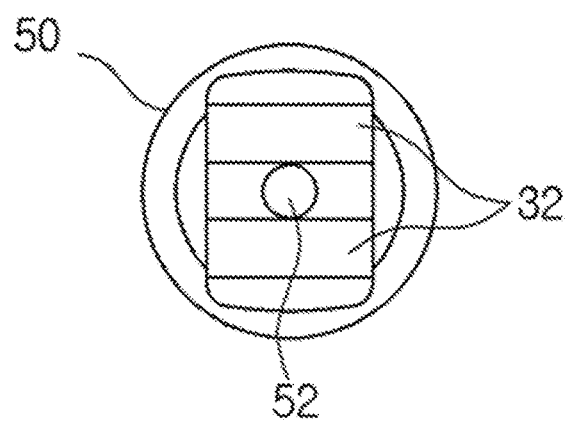

FIG. 6(a) shows a cross section of the sleeve 50 and the hook 32. FIG. 6(b) shows an outer surface of the sleeve 50. FIG. 6(c) shows a plan view of the stopper 55. FIG. 6(d) shows a plan view of the auxiliary pack 52. FIG. 6(e) shows a bottom view of FIG. 6(a). The sleeve 50 is formed in a substantially cylindrical shape, so that the sleeve 50 is tightly coupled to the lower end of the main pole 30. The auxiliary pack 52 is mounted to concentrically move in and out with respect to the sleeve 50, the hook 32, and the main pole 30. A teeth portion 53 is formed on an outer peripheral surface of the auxiliary pack 52. The stopper 55 has a guide hole 56 through which the auxiliary pack 52 passes. An inner surface of the guide hole 56 is formed to have a shape engaging with the teeth portion 53. A button 54 connected to one end of the stopper 55 is exposed to the outside of the sleeve 50. A spring 57 is connected to an opposite end of the stopper 55 to apply elastic force in the direction of pushing the button 54.

In a normal condition, the auxiliary pack 52 is hidden in the sleeve 50 and the stopper 55 restrains a vertical movement of the auxiliary pack 52 by the spring 57. When the button 54 is pressed, the stopper 55 moves, so that the engagement of the teeth portion 53 is released and the stopper 55 is pulled out by its own weight. When the stopper 55 is pulled out, the lower clip 22 and the hook 32 are spaced apart from the ground, so that it is advantageous to block the water that enters the tent upon sudden rain.

The present invention is not limited to the above-mentioned embodiments. It will be apparent to one having ordinary skill in the art that various deformations and modifications are available within the scope without departing from the spirit and scope of the present invention. Therefore, the deformations and modifications will be within the scope of the appended claims and their equivalents.

What is claimed is:

1. A tent system comprising:
    a fabric member including a body portion and a bottom portion to form a resident space;
    a fixing device disposed at the fabric member and including a mesh pocket, an upper clip, a lower clip and a side clip;
    two main poles coupled to the fabric member in an X-shape through the fixing device, in which one end of one of the two main poles is supported by the mesh pocket, and an opposite end of the one of the two main poles is supported by the lower clip; and
    an adjusting device that allows at least one of the fixing device and the two main poles to have a variable structure,
    wherein the adjusting device is configured that the lower clip has a coupling structure of a female member and a male member, the female member and the male member are slidable within a predetermined stroke distance, and the female member and the male member hold fastening holes, which are coupled to a hook, in an overlapped state.

2. The tent system of claim 1, wherein the one of the two main poles is provided at the one end thereof with a cap and at the opposite end thereof with the hook.

3. The tent system of claim 2, wherein the fixing device is configured that the upper clip is coupled to an upper end of the one of the two main poles forming an X-shape skeleton, and the lower clip is detachably engaged to the hook of the one of the two main poles.

\* \* \* \* \*